Figure 1:
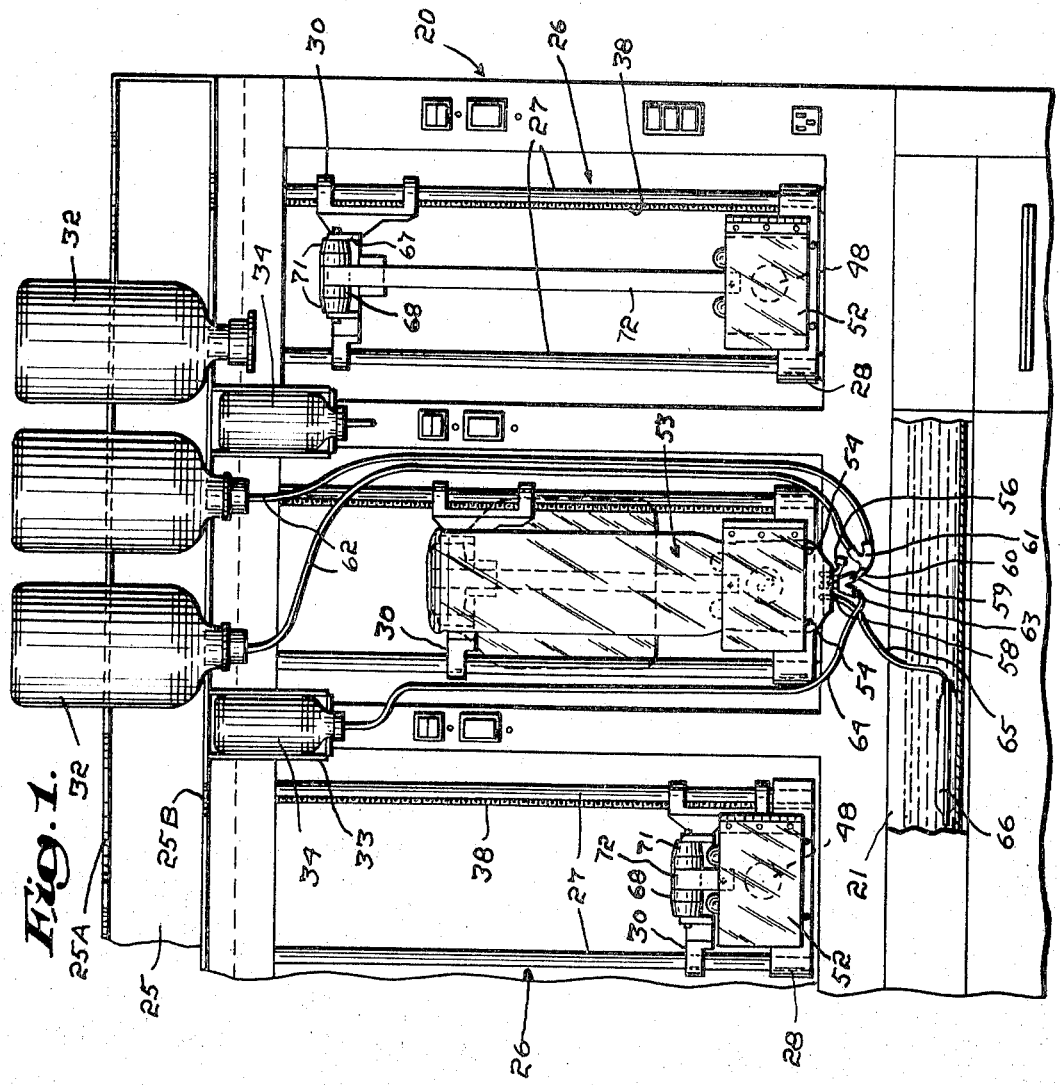

Nov. 7, 1967  K. VAN DYCK ET AL  3,351,432
APPARATUS FOR USE IN WASHING RED BLOOD CELLS IN RECONSTITUTING
BLOOD BY ADDITION OF PLASMA TO THE WASHED RED BLOOD CELLS
Filed Nov. 4, 1963  6 Sheets-Sheet 1

Inventors:
Kenneth Van Dyck,
Frederick J. Smith,
by Abb. Spear,
Attorney

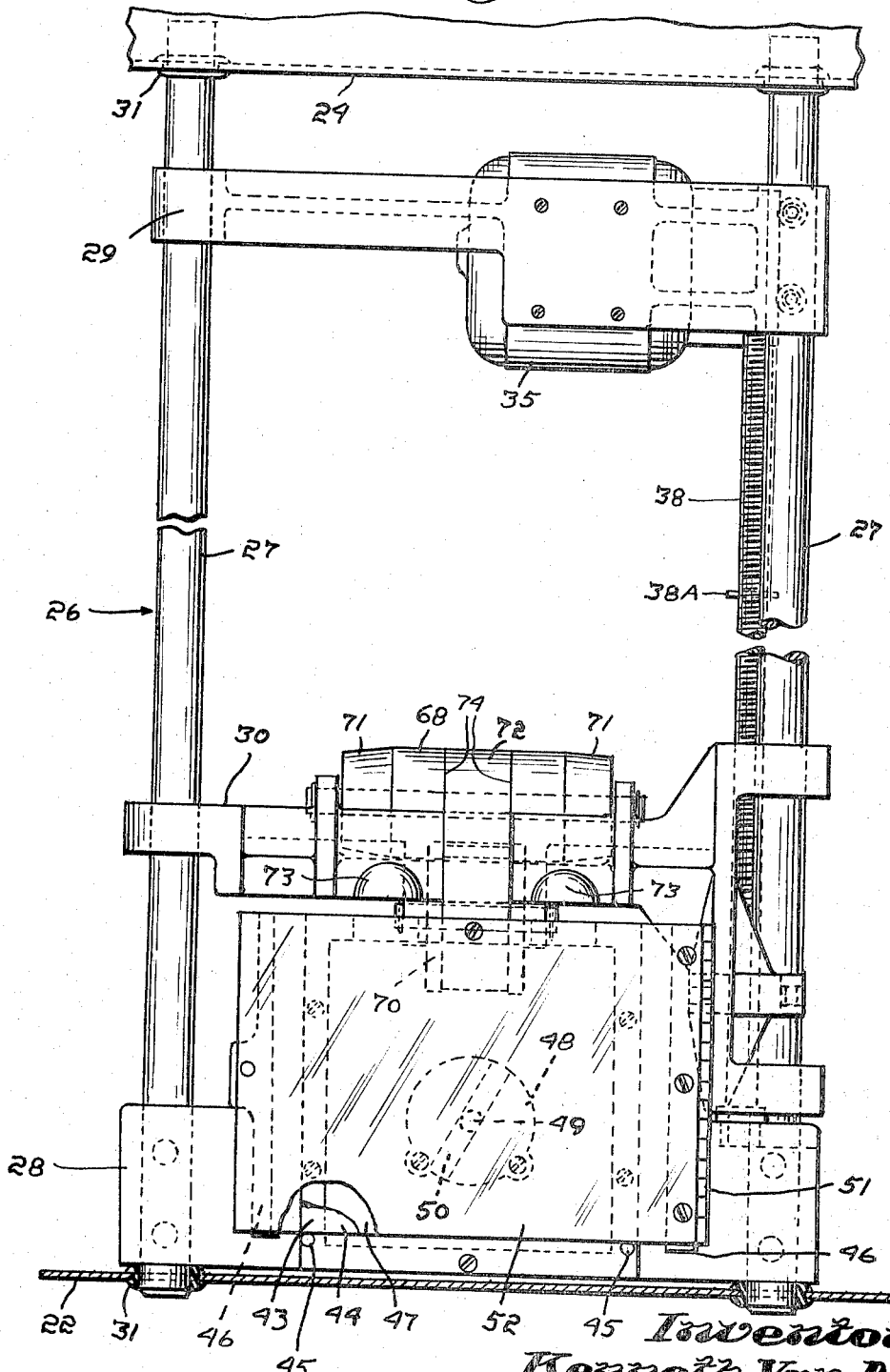

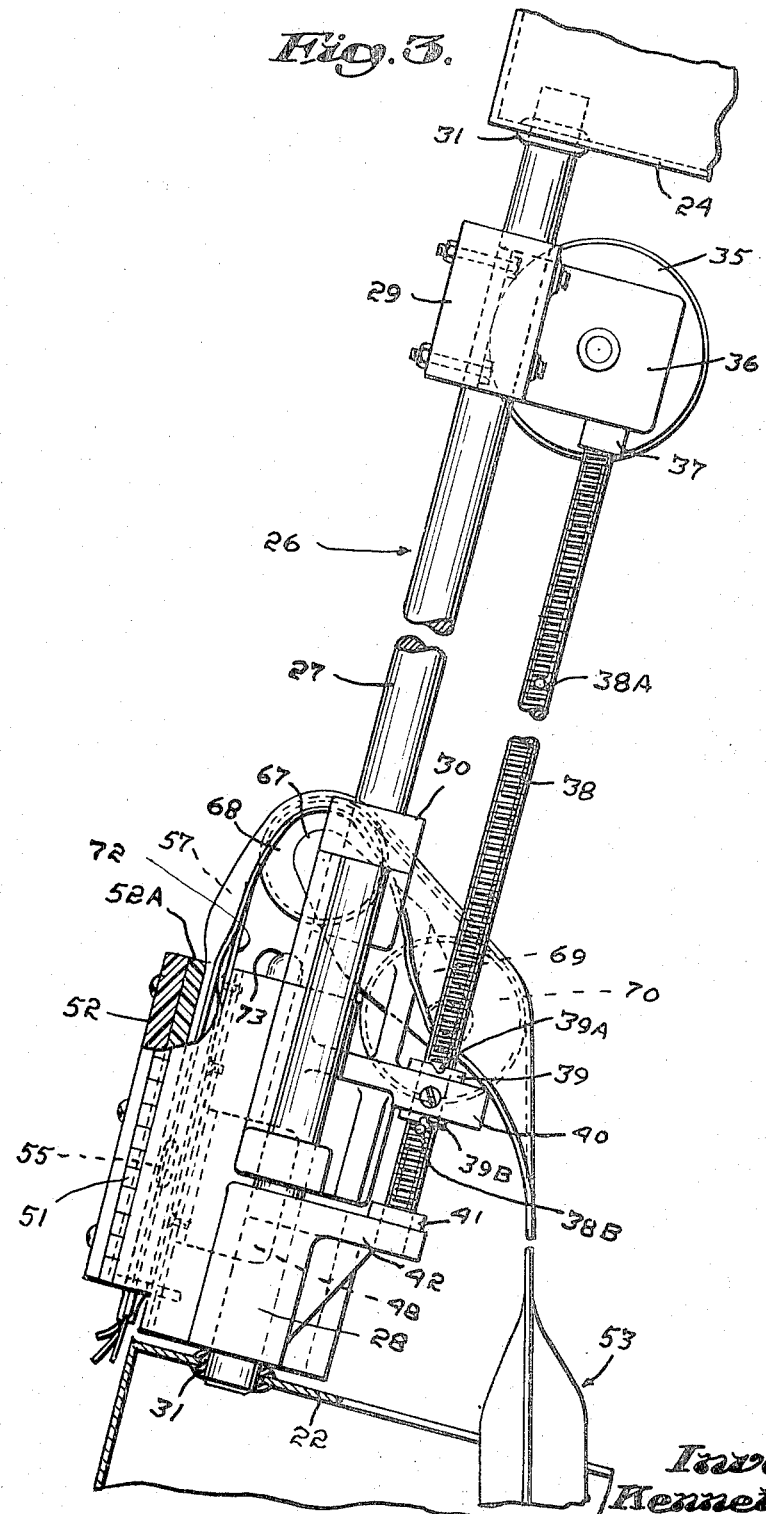

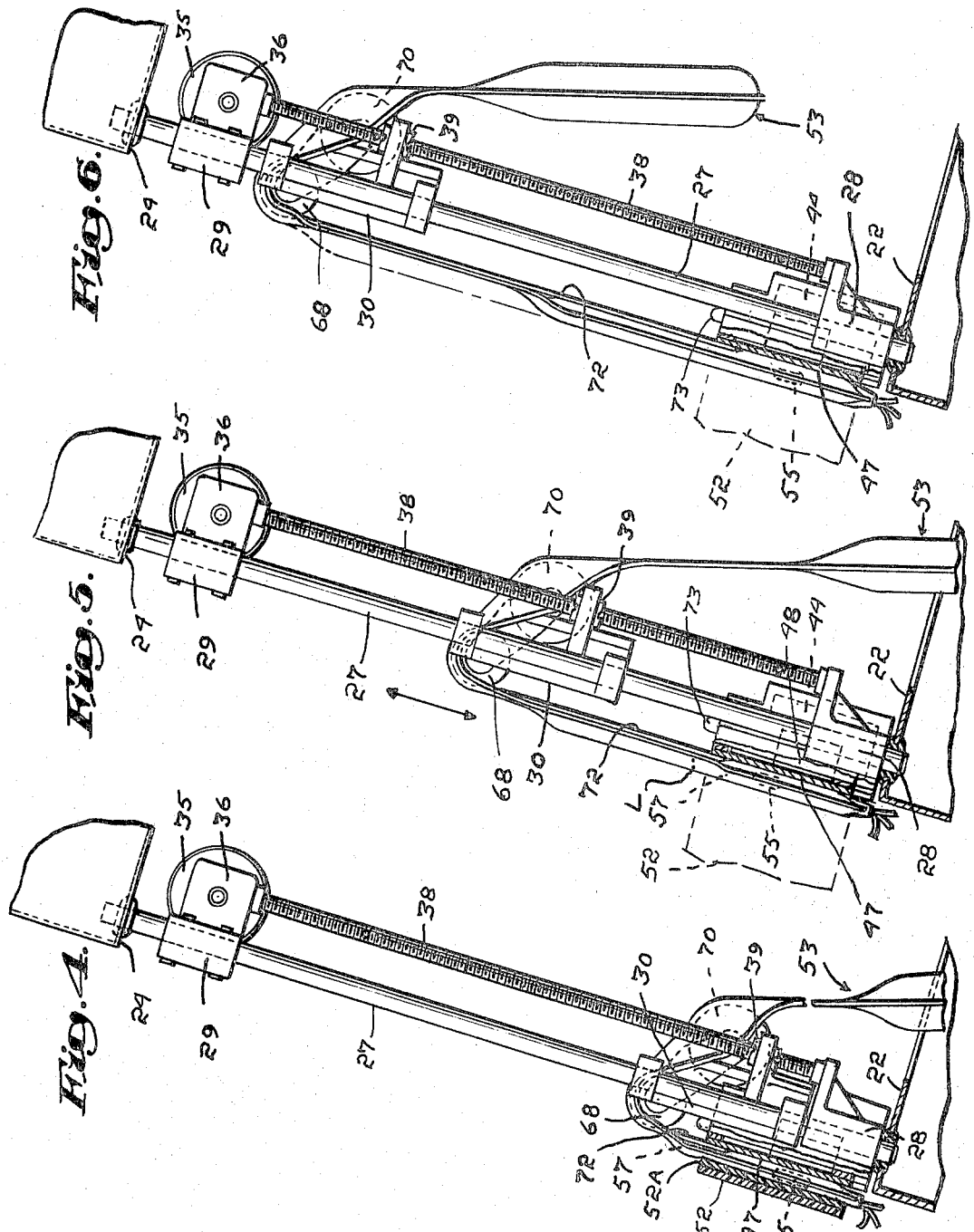

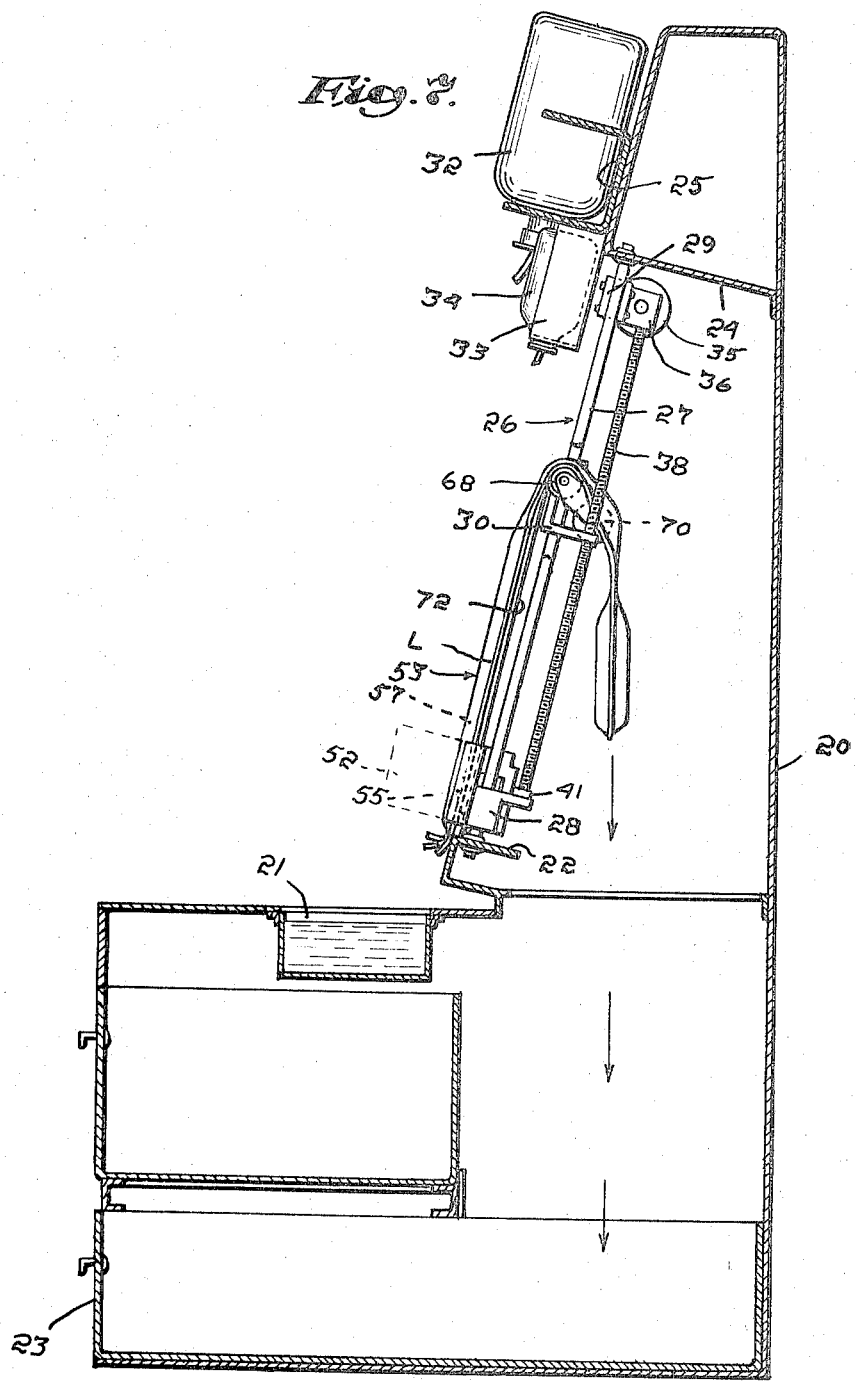

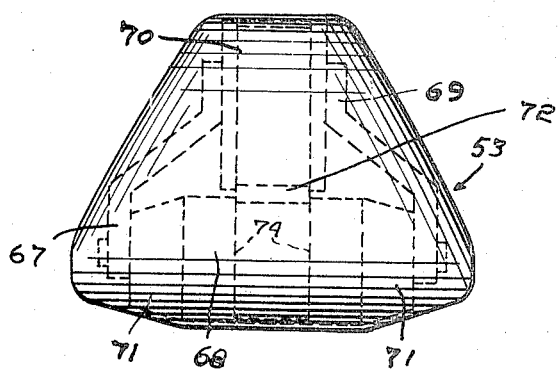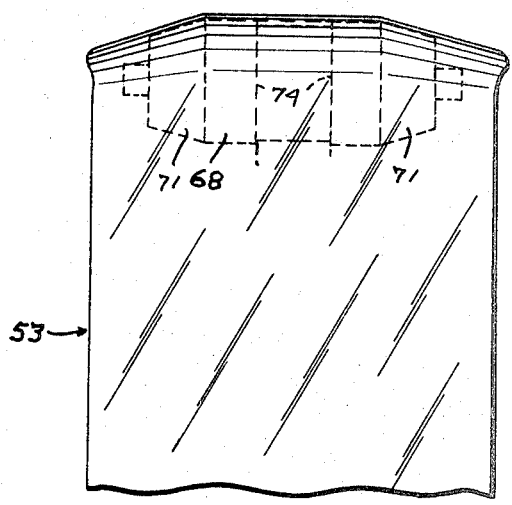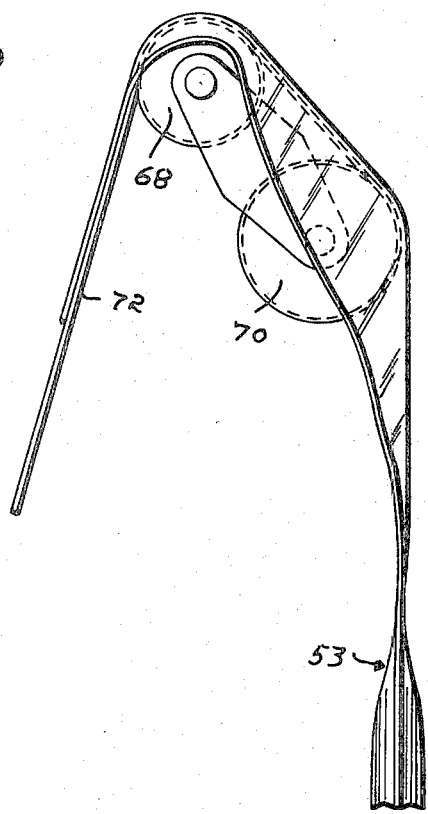

3,351,432
APPARATUS FOR USE IN WASHING RED BLOOD CELLS IN RECONSTITUTING BLOOD BY ADDITION OF PLASMA TO THE WASHED RED BLOOD CELLS
Kenneth Van Dyck, Westport, Conn., and Frederick J. Smith, Vestal, N.Y., assignors, by mesne assignments, to International Equipment Company, Needham Heights, Mass., a corporation of Massachusetts
Filed Nov. 4, 1963, Ser. No. 321,162
14 Claims. (Cl. 23—258.5)

The present invention relates to methods and apparatus for use in washing red blood cells and in reconstituting blood by the addition of plasma to the washed red blood cells.

It has long been recognized that important benefits would result if frozen units of red blood cells could be stored for long periods of time and readied for safe and effective use by mixing plasma with the cells after thawing. The discovery that mixing the red blood cells with a protective additive, dimethylsulfoxide, for example, enabled them to be frozen and thawed without injury led to the additional problem that the cells had to be washed to removed the additive before the addition of the reconstituting plasma. Such washing is effected by control of the electrolyte concentration of the washing liquid for, with such a concentration above 0.1%, red blood cells stay in suspension in water and plasma while below that concentration, the red blood cells are precipitated and the additive in the washing liquid, the liquid being, by way of example, an aqueous solution of 6% glucose and 1% fructose.

As a consequence, the thawed red cells may be washed in a liquid out of which they precipitate after stirring is stopped. The cells are then separated from the upper stratum of used washing liquid and washing may be continued with one or more similar baths with or without intermediate dispersions of the blood cells in a liquid whose electrolyte concentration is above 0.1%, to effect the removal of white cells, for example. After the washing of the cells is completed, the volume of plasma is added that reconstitutes the blood for use.

The principal objective of the present invention is to provide a simple and efficient method and apparatus for use in washing red blood cells, in separating the cells from the washing liquid, and in reconstituting blood from the washed cells.

In more detail, the method comprises the steps of mixing thawed red blood cells and the washing liquid in one end portion of an elongated bag of flexible transparent stock draped over a support with its other end portion depending, the washing liquid being one out of which the cells will precipitate. After the precipitation of the red cells, relative vertical movement is effected between the support and the first named bag end in a direction and to an extent causing the upper stratum, the waste washing liquid, to flow into the depending bag end.

In practice, the cells are washed two or three times and the bags have closed ends. For that reason, the cell-containing end of the bag is dimensioned to accommodate the thawed cells and the washing liquid of a bath when that end is spaced remotely from the support while the other end portion is dimensioned to accommodate the total volume of washing liquid, at least when the cell-containing bag end is proximate to the support so that, after the reconstituted blood is withdrawn, each bag and the used washing liquid become a conveniently handled, disposable unit.

In practice the bags, which are not themselves part of the present invention, are so ported that the blood cells, the washing liquid and the plasma can be introduced therein and the reconstituted blood withdrawn therefrom.

The apparatus, in more detail, includes a base, means for attaching the cell-containing end of the bag to the base, and supporting means above the base over which the bag is draped with its other end depending. The apparatus also includes means to effect relative movement between the base and the supporting means in a vertical direction between remote and proximate positions, the portion of the bag between the supporting means and the base, in the remote position, accommodating the blood cells and the washing liquid so that, when the cells precipitate from the liquid, relative movement towards the proximate position decreases the length of the attached bag end and increases the length of the depending end, both with reference to the supporting means, until the washing liquid stratum has flowed from the attached bag end.

A further object of the invention is to provide means facilitating the handling of the used washing liquid. This objective is attained by providing the apparatus with a drawer under the position occupied by the depending bag ends. With bags of the type having their depending ends sealed, the weight of the used washing liquid therein is enough to pull that bag over the carriage and into the drawer once the cell-containing end is detached from the base.

As it is important that the liquid flow uninterruptedly into the depending bag end and that the attendant be able to control the flow so that it can be arrested at the line of demarcation between the strata to avoid any substantial waste of red cells, the support of the bag requires that flow-restricting or preventing crimps be avoided. In accordance with the invention, this objective is ensured by providing supporting means with a roller whose length is slightly less than the width of the bag so that at least one margin of the bag is unsupported and hence serves as a conduit for the liquid and held open by providing the supporting means with a second roller, narrower than the first roller and located centrally thereof but spaced rearwardly and below it to prevent crimping of such a marginal conduit or conduits.

Yet another objective of the invention is concerned with an extensible bag support for use when the path of the supporting means relative to the cell receiving end of the bag is rearwardly and upwardly inclined, the bag supporting means being preferably in the form of a band anchored to the base and to the supporting means, and trained over the first roller and self-winding on the second named roller.

In the accompanying drawings, there is shown an illustrative embodiment of the invention from which these and other of its objectives, novel features, and advantages of both the methods and the apparatus will be readily apparent.

In the drawings:

FIGURE 1 is a fragmentary, front elevation of the apparatus,

FIGURE 2 is a similar view, on a substantially increased scale, of one of the stations of the apparatus, FIGURE 3 is a side view of that part of the apparatus with a bag in place, FIGURE 4 is a similar and somewhat schematic view illustrating the disposition of a bag in the low position of the carriage, FIGURE 5 is a similar view with the carriage in a mid position, FIGURE 6 is a like view with the carriage shown in its high position, FIGURE 7 is a vertical cross section of the machine illustrating the bag-receiving drawer, FIGURE 8 is a fragmentary plan view illustrating the position of a bag on the supporting rollers of the carriage, FIGURE 9 is a similar view but with the bag and rollers viewed from the front of the machine, and FIGURE 10 is a fragmentary side view of the rollers and the bag.

The apparatus shown in the drawings consists of a cabinet 20 having a sink 21 forwardly of and below a shelf 22 and a drawer 23. The apparatus is provided with water circulating and heating means enabling water to be delivered into the sink with its temperature suitably regulated and controlled for use in thawing bags containing frozen blood cells, but such means are not herein detailed.

Extending across the top of the cabinet is an inwardly disposed shelf 24 and an outwardly opening U-shaped support 25 with the space between the shelves 22 and 24 providing space for the several generally indicated units 26. Each unit has a pair of posts 27 interconnected adjacent their lower ends by a base 28 and adjacent their upper ends by a head 29 to establish a vertical way along which supporting means in the form of a carriage 30 are slidable. The exposed upper and lower ends of the posts 27 are removably entered in grommets 31 with which the shelves 22 and 24 are provided.

It will be noted, see FIGURE 3, that the shelves 22 and 24 are parallel and are rearwardly and downwardly inclined with the posts 27 being similarly positioned. The walls of the support 25 are recessed as at 25A and 25B, respectively, to provide supports for washing liquid bottles 32, two for each unit 26, and the support 25 is also provided with holders 33, one for each unit 26 and dimensioned to support a plasma bottle 34.

The head 29 of each unit 26 carries a reversible motor 35 provided with a speed reducer unit 36 to the outfeed shaft 37 whereof one end of a threaded shaft 38 is connected. The shaft 38 is threaded through a conventional planetary drive assembly 39 mounted in a rearward flange 40 with which the carriage 30 is provided and has its other end supported by a bearing 41 mounted in a rearward underlying flange 42 of the base 28. The assembly 39 is not detailed other than to note that it has upper and lower slots 39A and 39B engageable, respectively, by the vertically spaced shaft limit pins 38A and 38B thereby to cause the assembly to rotate with the shaft 38 to prevent further travel of the carriage 30 in the direction in which it has been moving. Such assembly may be of the type manufactured by Roton Products of Valparaiso, Indiana.

By these or equivalent means, the carriage 30 may be moved between predetermined upper and lower positions and stopped in and reversed from any intermediate position.

The base 28 has a face 43 having a rearwardly extending chamber 44 opening centrally thereof, a pair of spaced anchor pins 45 adjacent its bottom edge, and vertically extending side walls 46. Secured to the face 43 is a plate 47 of non-magnetic stock, preferably stainless steel, which supports a motor 48 in the chamber 44, with the motor shaft 49 shown as carrying a permanent magnet 50 of the bar type, transversely thereof. Attached to one side wall 46, as by a hinge 51, is a transparent cover 52 provided, on its inner surface with a pressure plate 52A, see FIGURE 3.

A bag for use with the apparatus is generally indicated at 53 and is elongated and flexible with closed ends and formed from transparent plastic stock that is inert, permits sterilization, and otherwise is adapted for use in processing red blood cells. In practice, it may be formed from two sheets marginally sealed together with the bag 53 being of a width to fit between the side walls 46 of the base and having eyes 54 adjacent one end, one eye for each anchor pin 45 and dimensioned to receive it thereby to secure the bag 53 to the base 28 and to prevent its removal when the cover 52 is closed.

Within the attached end of the bag 53 there is a magnetically responsive stirrer 55 turning, in the attached bag end, when the motor 49 is in service in response to its magnet 50.

The attached end of the bag 53 is shown as having three tubes in communication with its interior. Of these, the tube 56 is now closed as it was used to deliver into the bag 53 a predetermined volume of red blood cells and the protective additive. In practice the red cells are frozen and stored in a frozen state in the bag 53 in a thin layer. Before use the bag is placed in a warm bath in the sink 21 and the thawed red cell mass is indicated at 57. The tube 58 is shown as having a Y 59 with a branch 60 including a Y 61 whose branches 62 are each connected to an appropriate one of the washing liquid bottles 32. The other branch 63 of the Y 59 is connected to a plasma bottle 34 by a conduit 64. The tube 65 is for use in delivering the reconstituted blood into a transfusion bag 66. The means for controlling the flow through the several tubes are not shown but these may be clamps enabling the washing liquid or plasma to be delivered into the bag 53 or the reconstituted blood to be transferred to the bag 66 and the conduits to be severed and sealed thereafter.

The bag 53 is shown as of sufficient length to be draped over the carriage 30 with its other end depending over the inner end of the drawer 23. It will be noted that the bag 53 is of sufficient length to permit its above disposition even when the carriage 30 is in its uppermost position, see FIGURE 6. When the carriage move towards its lowermost position, the length of its depending end increases and the length of its attached end decreases, both with reference to the carriage 30.

In use, with the bag 53 disposed as above described and with one end attached to the base 28, the red cells 57 may now be washed in order to remove the additive used to protect them during freezing and thawing. For such washing, see FIGURES 4–7, a predetermined volume of washing liquid is introduced into the attached bag end from the bottles 32 with the magnetic stirrer in operation and with the cover 52 open. After the washing liquid and the blood cells have been suitably mixed, the operator stops the stirrer, after the red blood cells have settled out, he closes the cover 52 and lowers the carriage 30 while watching the line of demarcation L between the lower stratum of red blood cells and the upper stratum of used washing liquid. As the carriage 30 lowers, liquid flows into the depending bag end until the red cell stratum remains, the additive having drained off with the used washing liquid. Because of the pressure plate 52A, the closing of the cover has a displacing effect raising the line of demarcation, of advantage, for example, when otherwise, with the carriage in its lowermost position, not all of the upper stratum would be drained off or when the operator wanted to use the closing of the cover as a control for such draining.

This process is repeated until the red cells have been sufficiently washed so that plasma may be added from the connected plasma bottle 34. The reconstituted blood is then permitted to flow into the transfusion bag which is then separated from the bag 53 with the ends of the severed conduit 65 sealed. The other conduits are also severed with the resulting ends also sealed. The attached end of the bag is then released with the weight of the used washing liquid pulling that end of the bag over the carriage 30 with the bag dropping into the drawer 23 for later disposal. It should be noted that it is sometimes indicated that a small amount of plasma be introduced into the bag 53 between baths to effect cell suspension and means for so delivering controlled amounts of plasma may be incorporated in the conduit 64.

It will be appreciated that the used washing liquid in the depending end of the bag 53 exerts a strong pull on the bag. In order to ensure that the flow into the depending bag end is unobstructed, the carriage 30 is provided with a pair of ears 67 supporting a roller 68 and with a second pair of ears 69 supporting a second roller 70 rearwardly of and below the roller 68.

It will be noted that the length of the roller 68 is somewhat less than the width of the bag 53 so that the bag margins overhang the tapered roller ends 71, see FIGURES 8–10, and, regardless of the pull on the bag 53, the unsupported margins constitute conduits that are held against being closed as by crimping, by the roller 70 which is much narrower than the roller 68.

An extensible support, see particularly FIGURES 2 and 3, is provided for the portion of a bag 53 between the base 28 and the carriage 30, the support being shown as a metal band 72 attached at one end to the base 28 between background lamps 73. The band 72 is in effect a coil spring and is trained over the roller 68, being guided in its shallow central groove 74, and with its other end attached to and self-winding on the roller 70.

From the foregoing, it will be apparent that methods and apparatus in accordance with the invention meet the problems involved in red cell washing and ensure that blood can be safely, efficiently, and economically reconstituted therefrom.

We claim:

1. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation between the precipitated cells and the used washing liquid to be seen, said apparatus including a base, means for attaching said bag end thereto, supporting means above said base over which the bag is draped with its other end depending, and means to effect relative movement between the base and the supporting means in a vertical direction between remote and proximate positions, the portion of the bag between the supporting means and the base in said remote position accommodating the blood cells and washing liquid whereby when the cells precipitate from the liquid, relative movement towards said proximate position decreases the length of the attached bag end and increases the length of the depending bag end with reference to the supporting means until the washing liquid stratum has flowed from the attached bag end.

2. The apparatus of claim 1 in which the base includes stirring means.

3. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation between the precipitated cells and the used washing liquid to be seen, said apparatus including a base, means for attaching said bag end thereto, a vertical and rearwardly inclined way, a carriage over which the bag is draped with its other end depending, movable along said way between remote and proximate positions, the portion of the bag between the carriage and the base in said remote position accommodating the blood cells and washing liquid whereby when the cells precipitate from the liquid, relative movement towards said proximate position decreases the length of the attached bag end and increases the length of the depending bag end with reference to the carriage until the washing liquid stratum has flowed from the attached bag end.

4. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation between the precipitated cells and the used washing liquid to be seen, said apparatus including a base, means for attaching said bag end thereto, supporting means above said base, said supporting means including a relatively wide roller and a relatively narrow roller rearwardly of and below said first named roller, the bag being draped over said rollers with its other end depending, and means to effect relative movement between the base and the supporting means in a vertical direction between remote and proximate positions, the portion of the bag between the supporting means and the base in said remote position accommodating the blood cells and washing liquid whereby when the cells precipitate from the liquid, relative movement towards said proximate position decreases the length of the attached bag end and increases the length of the depending bag end with reference to the supporting means until the washing liquid stratum has flowed from the attached bag end.

5. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation between the precipitated cells and the used washing liquid to be seen, said apparatus including a base, means for attaching said bag end thereto, supporting means above said base over which the bag is draped with its other end depending, and means to effect relative movement between the base and the supporting means in a vertical and rearwardly inclined direction between remote and proximate positions, the portion of the bag between the supporting means and the base in said remote position accommodating the blood cells and washing liquid, and an extensible bag support interconnecting said base and said supporting means whereby when the cells precipitate from the liquid, relative movement towards said proximate position decreases the length of the attached bag end and increase the length of the depending bag end with reference to the supporting means until the washing liquid stratum has flowed from the attached bag end.

6. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation between the precipitated cells and the used washing liquid to be seen, said apparatus including a base, means for attaching said bag end thereto, supporting means above said base, said supporting means including a relatively wide roller and a relatively narrow roller rearwardly of and below said first named roller, the bag being draped over said rollers with its other end depending, and means to effect relative movement between the base and the supporting means in a vertical, rearwardly inclined direction between remote and proximate positions, the portion of the bag between the supporting means and the base in said remote position accommodating the blood cells and washing liquid, and an extensible bag support interconnecting said base and in the form of a band connected to said base, trained over said first roller and self-winding about said second roller, whereby when the cells precipitate from the liquid, relative movement towards said proximate position decreases the length of the attached bag end and increases the length of the depending bag end with reference to the supporting means until the washing liquid stratum has flowed from the attached bag end.

7. The apparatus of claim 6 in which the first roller has a central channel receiving the band.

8. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation between the precipitated cells and the used washing liquid to be seen, said apparatus including a base, means for attaching said bag end thereto, supporting means above said base over which the bag is draped with its other end depending, means to effect relative movement between the base and the supporting means in a vertical direction between remote and proximate positions, the portion of the bag between the supporting means and the base in said remote position accommodating the blood cells and washing liquid whereby when the cells precipitate from the liquid, relative movement towards said proximate position decreases the length of the attached bag end and increases the length of the depending bag end with reference to the supporting means until the washing liquid stratum has flowed from the attached bag end, and a drawer underlying the depending bag end and receiving the bag when liquid is in its depending end and its ported end is detached from said base.

9. In combination, an elongated bag of flexible plastic stock ported to enable a predetermined volume of washing liquid to be added to red blood cells in one end thereof and from which liquid the blood cells precipitate, said bag stock being sufficiently transparent to enable the line of demarcation between the precipitated cells and the used washing liquid to be seen, and apparatus including a base, means for attaching said bag end to said base, supporting means above said base over which the bag is draped with its other end depending, and means to effect relative movement between the base and the supporting means in a vertical direction between remote and proximate positions, the portion of the bag between the supporting means and the base in said remote position accommodating the blood cells and the washing liquid whereby when the cells precipitate from the liquid relative movement towards said proximate position decreases the length of the attached bag end and increases the length of the depending bag end with reference to the supporting means until the washing liquid stratum has flowed from the attached bag end.

10. In combination, an elongated closed bag of flexible plastic stock ported to enable a predetermined volume of washing liquid to be added to red blood cells in one end thereof and from which liquid the blood cells precipitate, said bag stock being sufficiently transparent to enable the line of demarcation between the precipitated cells and the used washing liquid to be seen, and apparatus including a base, means for attaching said bag end to said base, supporting means above said base over which the bag is draped with its other end depending, means to effect relative movement between the base and the supporting means in a vertical direction between remote and proximate positions, the portion of the bag between the supporting means and the base in said remote position accommodating the blood cells and the washing liquid whereby when the cells precipitate from the liquid relative movement towards said proximate position decreases the length of the attached bag end and increases the length of the depending bag end with reference to the supporting means until the washing liquid stratum has flowed from the attached bag end, and a drawer underlying said depending end to receive the bag when the attaching means are released.

11. In combination, an elongated bag of flexible plastic stock ported to enable a predetermined volume of washing liquid to be added to red blood cells in one end thereof and from which liquid the blood cells precipitate, said bag stock being sufficiently transparent to enable the line of demarcation between the precipitated cells and the used washing liquid to be seen, and apparatus including a base, means for attaching said bag end to said base, supporting means above said base over which the bag is draped with its other end depending, said supporting means including a roller of less width than said bag thus leaving at least one bag margin as an unsupported conduit and a second, narrower roller located behind and below said first named roller and holding said bag to prevent the crimping of said conduit, and means to effect relative movement between the base and the supporting means in a vertical direction between remote and proximate positions, the portion of the bag between the supporting means and the base in said remote position accommodating the blood cells and the washing liquid whereby when the cells precipitate from the liquid relative movement towards said proximate position decreases the length of the attached bag end and increases the length of the depending bag end with reference to the supporting means until the washing liquid stratum has flowed from the attached bag end.

12. The combination of claim 11 in which the first roller has tapering end portions.

13. In combination, an elongated bag of flexible plastic stock ported to enable a predetermined volume of washing liquid to be added to red blood cells in one end thereof and from which liquid the blood cells precipitate, said bag stock being sufficiently transparent to enable the line of demarcation between the precipitated cells and the used washing liquid to be seen, and apparatus including a base, means for attaching said bag end thereto, lamps carried by said base in back of said bag end, supporting means above said base over which the bag is draped with its other end depending, and means to effect relative movement between the base and the supporting means in a vertical direction between remote and proximate positions, the portion of the bag between the supporting means and the base in said remote position accommodating the blood cells and the washing liquid whereby when the cells precipitate from the liquid relative movement towards said proximate position decreases the length of the attached bag end and increases the length of the depending bag end with reference to the supporting means until the washing liquid stratum has flowed from the attached bag end.

14. In apparatus for use in washing red blood cells and reconstituting blood therefrom in an end of an elongated bag of flexible plastic stock ported to enable a predetermined volume of washing liquid to be added to the cells therein and from which the blood cells precipitate, said bag stock being sufficiently transparent to enable the line of demarcation beween the precipitated cells and the used washing liquid to be seen, said apparatus including a base, means for attaching said bag end thereto, supporting means above said base over which the bag is draped with its other end depending, means to effect relative movement in a vertical direction between remote and proximate positions, the portion of the bag between the supporting means and the base in said remote position accommodating the blood cells and washing liquid whereby when the cells have precipitated from the liquid relative movement towards said proximate position decreases the length of the attached bag and end and increases the length of the depending bag end with reference to the supporting means until the washing liquid stratum has flowed from the attached bag end, and means to apply pressure to the attached bag end to raise the line of demarcation between the strata relative to the supporting means.

References Cited

UNITED STATES PATENTS 3,074,402  1/1963  Broman _____ 23—258.5

OTHER REFERENCES

Gibson, Blood Component Therapy, reprint from the Bulletin of the South Central Assn. of Blood Banks, title page and pages 6 and 9 (December 1959).

Huggins, Vox Sanguinis, vol. 8, No. 1, pages 99–100 (January–February 1963).

Huggins, Surgery, pages 191–194 (July 1963).

JOSEPH SCOVRONEK, *Acting Primary Examiner.*